April 18, 1944.  A. L. JACKSON  2,346,686
ELECTRIC MEAT CHOPPER AND TENDERIZER
Filed May 27, 1942  3 Sheets-Sheet 1
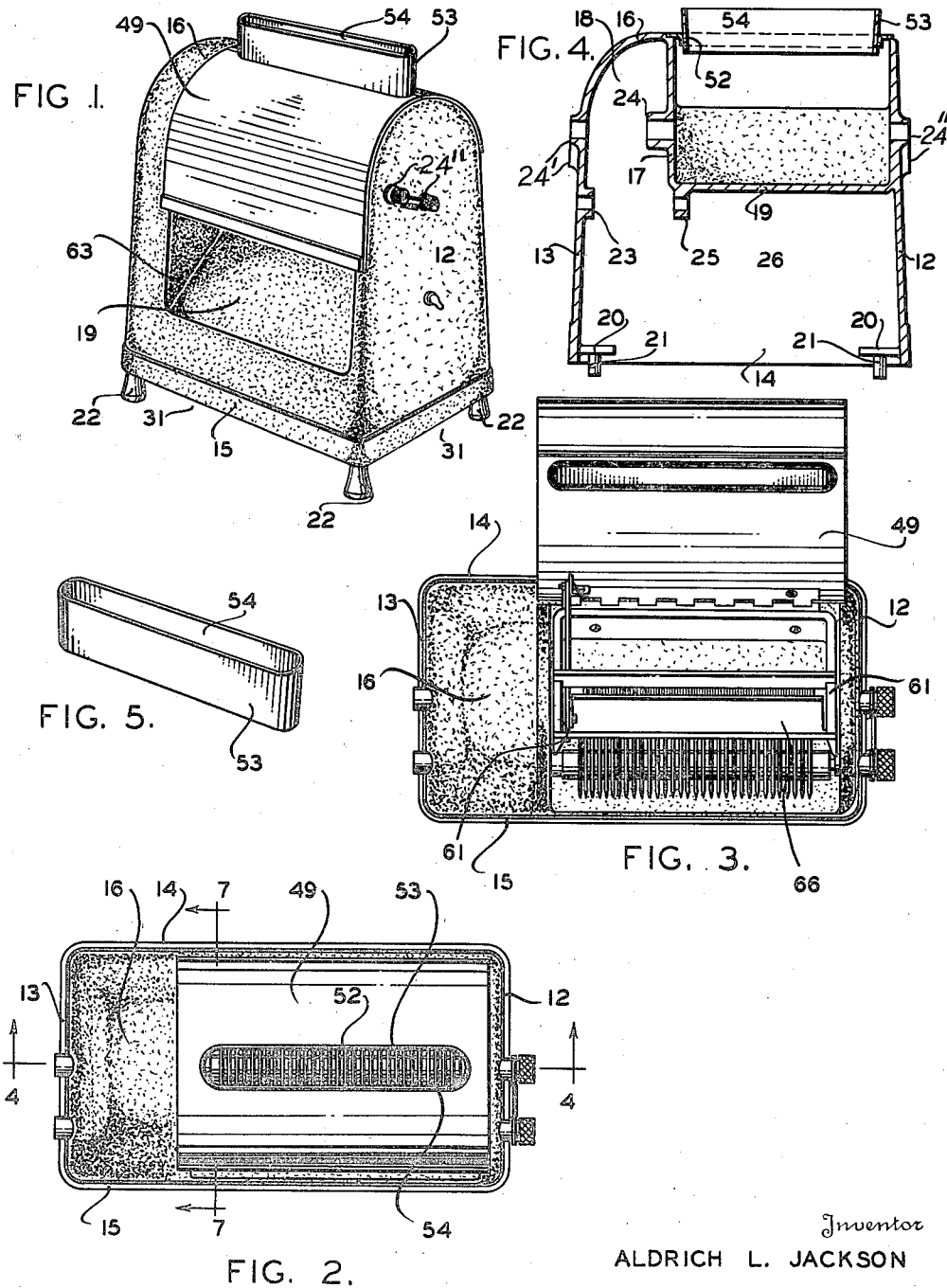
Inventor
ALDRICH L. JACKSON
Attorney April 18, 1944.  A. L. JACKSON  2,346,686
ELECTRIC MEAT CHOPPER AND TENDERIZER
Filed May 27, 1942  3 Sheets-Sheet 2
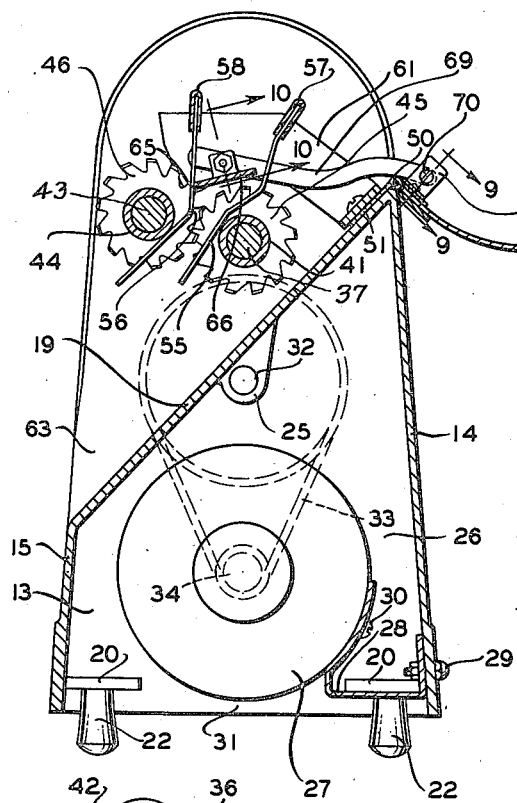
FIG. 6.
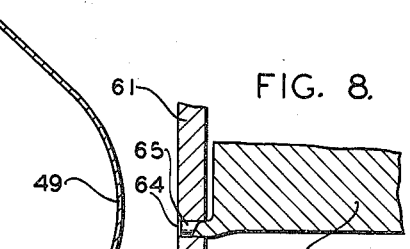
FIG. 8.
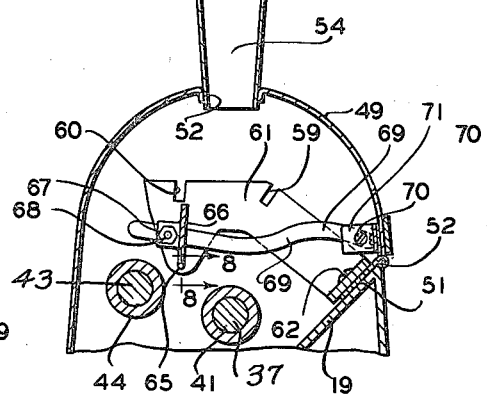
FIG. 7.
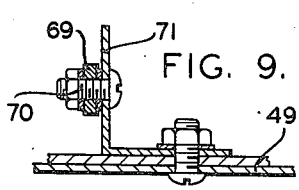
FIG. 9.
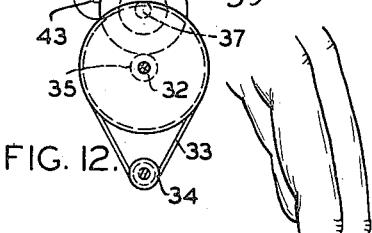
FIG. 12.
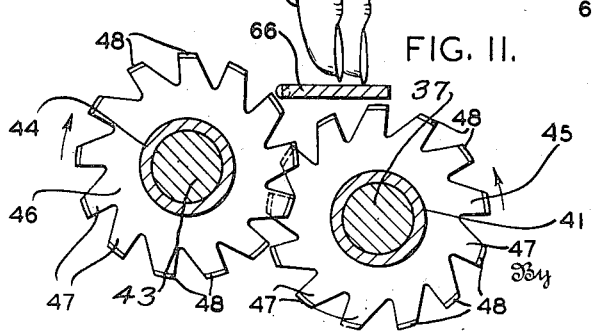
FIG. 11.
FIG. 10.
Inventor
ALDRICH L. JACKSON
Howard Fischer
Attorney April 18, 1944.  A. L. JACKSON  2,346,686
ELECTRIC MEAT CHOPPER AND TENDERIZER
Filed May 27, 1942  3 Sheets-Sheet 3
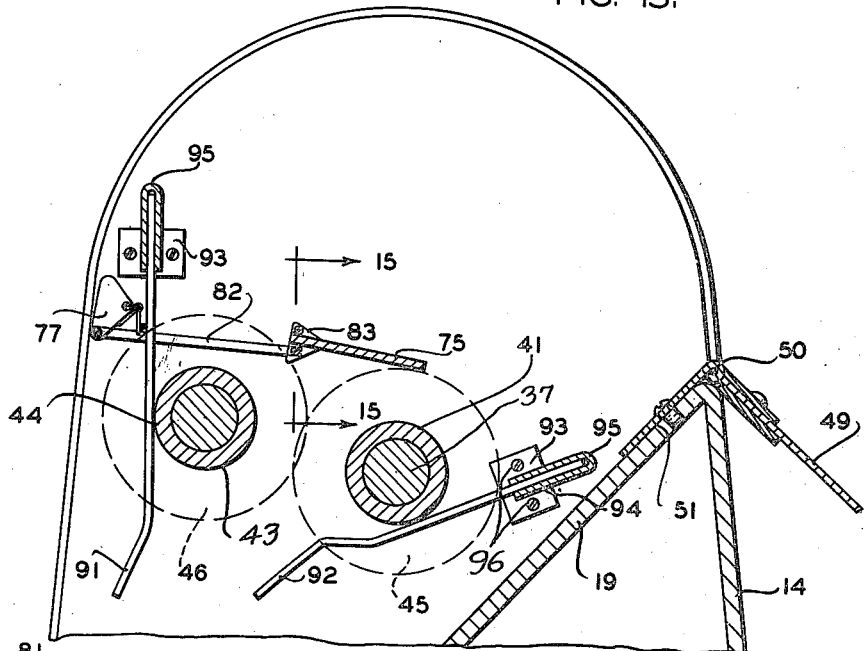
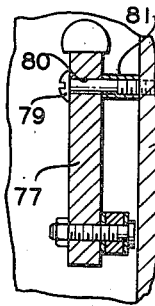
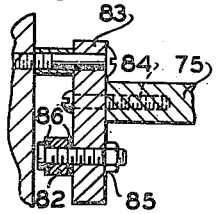
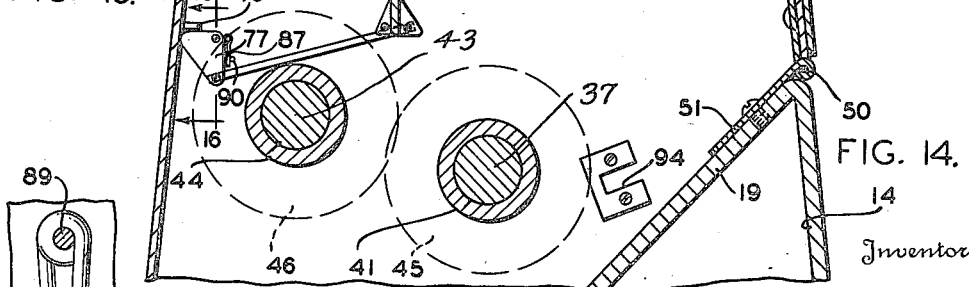
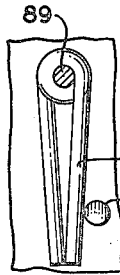
Inventor
ALDRICH L. JACKSON
Attorney Patented Apr. 18, 1944

2,346,686

UNITED STATES PATENT OFFICE 2,346,686

ELECTRIC MEAT CHOPPER AND TENDERIZER

Aldrich L. Jackson, Minneapolis, Minn.

Application May 27, 1942, Serial No. 444,753

9 Claims. (Cl. 17—26)

This application relates to an electric meat chopper and tenderizer of the type shown and described in my pending application for Letters Patent of the United States, Serial No. 378,185, filed February 10, 1941, and has for its object to provide novel means for protecting the fingers of an operator from being drawn in between the cutters which might result in very seriously mangling the fingers and hands. The protecting means operates automatically to close or fill the space above the overlapping peripheries of the cutting rollers when the cover is swung back to open the top of the machine. The protecting means is moved out of the throat leading to the cutters when the cover is restored to closing position.

In the machine of my aforesaid application I provide a pair of rollers carrying a large number of cutter discs with knife-like projections which are positioned alternatively on the several rollers, and which are driven in opposite directions so that the knives move toward each other in the throat. This operation upon a piece of steak resulted in causing a very large number of cuts to be made in both sides of the steak extending through the steak with the result that when the steak is cooked the juices released in the cooking operation are retained in the cuts and about the uncut portions of the steak and the cooked meat when eaten has a tender, delicious taste. In this manner cuts of meat (which are normally not so expensive) may be tenderized to improve the flavor and the pleasant effect in eating the same. My machine tenderizes the meat and makes it more palatable whatever may be the cut of meat.

In practice when the cover is in position on the machine there is no danger of an operator getting his hands caught between the approaching teeth of the rapidly revolving cutter blades of the tenderizing wringer-like rollers. However, when the operator wishes to clean or sharpen the blades the cover is tipped into open position, leaving the machine running. When the machine is running with the cover open my blade guard means is automatically moved into position to shield the operator's fingers as well as preventing the sharpening tool or any other article from being drawn between the wringer-like tenderizing rolls.

The present invention obviates this difficulty by providing means such that when the cover is tipped into open position to expose the blade tenderizing rollers, a protector member or means is simultaneously moved into position so that the fingers cannot enter the space between the rotating knives where they could be caught and mangled. The closing of the cover to its normal working position removes this guard and opens the feed throat of the machine directly to the tenderizing blades of the rollers. It follows that operators cannot use the machine for the purpose of tenderizing meat when the cover is tipped into open position and the rotating knives are exposed so that they could catch or grasp the fingers. However, the sharpening and cleaning tool can be used when the cover is tipped away from the tenderizing rollers. Also, when for any purpose the operator swings back the cover while the knives are still running, the protective guard means will be positioned to prevent anything from being caught or drawn between the wringer cutter blades.

It is a principal object of my invention, therefore, to provide in a meat tenderizer embodying pairs of rotating rollers carrying interlacing cutting blade knives, a guard member together with connections therefrom to the cover member so that when the cover member is swung back to expose the rotating blade knives at the top of the machine, the guard member will be swung into position to close the space between the sets of rotating knives where fingers of the operator can be caught and mangled.

It is a further object of my invention to provide a plate member pivotally hinged to the casing of the machine and linkage, cam, lever or other suitable means connecting said plate member to the cover member so that when the cover member is swung back to expose the knife-blades, the guard means will be moved across the throat leading to the rotating knives so that the fingers of the operator cannot reach a position where the knives can seize and mangle them.

It is a further object of my invention to provide symmetrical end plates, one of them spaced from the throat and cutter mechanism of the machine to provide a housing for the gearing within the main casing of the machine and to provide for swinging the cover member in planes parallel to the end members, which greatly improves the appearance of the machine and adds to its efficiency in operation.

A further object is to provide a unitary casting which forms a strong, rigid construction for housing the working parts.

It is a further object of my invention to provide in the cover member a removable tubular auxiliary guard throat piece preferably with converging walls which guides the meat through the cover member and which prevents the fingers from reaching into the tenderizing blades, said throat piece being readily removable so that it can be conveniently washed and kept in such a cleansed condition as to be attractive for inspection of customers where the meat is sold and tenderized.

It is a further object of my invention to provide a gear train housed within one of the end members of the outer casing, which will be conveniently positioned and readily accessible for inspection and repair and which at the same time, in connection with the main belt and pulley drive, will provide a sufficient speed reduction from a high speed motor.

It is a further object of my invention to mount the motor within the casing to enclose the same yet providing a space for air ventilation at the bottom edge of the base to keep the motor cool.

It is a further object of my invention to provide supporting bars extending across between the two ends of the casting and to mount rubber legs and feet directly upon said supporting bars so that no part of the casing will contact the floor or surface upon which the apparatus rests, thus cushioning the whole machine.

The full objects and advantages of my invention will appear in detail in the specification hereinafter presented and the novel features by which the aforesaid advantageous results are obtained will be particularly pointed out in the claims.

In the drawings illustrating an application of my invention in one form:

Fig. 1 is a prespective elevation view of the invention with the cover closed.

Fig. 2 is a top plan view of the invention with the cover closed.

Fig. 3 is a top plan view of the invention with the cover open, showing the guard in protecting position.

Fig. 4 is a sectional side elevation view taken on line 4—4 of Fig. 2, with the stripper fingers, motor and working parts removed, showing only the unitary frame.

Fig. 5 is a perspective view of the removable upper guard and guide throat.

Fig. 6 is a transverse sectional elevation view, showing the cover swung out into open position.

Fig. 7 is a sectional view of the upper part of the machine taken on line 7—7 of Fig. 2, viewed in the direction of the arrows.

Fig. 8 is an enlarged sectional detail view taken on line 8—8 of Fig. 7.

Fig. 9 is an enlarged detail sectional view taken on line 9—9 of Fig. 6.

Fig. 10 is an enlarged sectional detail view taken on line 10—10 of Fig. 6.

Fig. 11 is a transverse sectional schematic view illustrating how my invention protects against getting the fingers caught between the rollers.

Fig. 12 is a transverse view with the shafting mostly in section, showing the gearing for driving the cutter rolls.

Fig. 13 is an enlarged transverse sectional view of the upper part of the machine, similar to Fig. 7, but illustrating a modified form of guard means.

Fig. 14 is an enlarged transverse sectional view similar to that illustrated in Fig. 13, but showing the cover in a closed position.

Fig. 15 is an enlarged sectional detail view, taken on the line 15—15 of Fig. 13.

Fig. 16 is an enlarged detail sectional view, taken on the line 16—16 of Fig. 14.

Fig. 17 is a plan view of the spring means which is adapted to operate the guard means when the cover is in an open position.

As illustrated the main frame of my meat tenderizing machine comprises a main casting having end walls 12 and 13, a rear wall 14, a front wall 15, and a top wall which consists of parts as follows: a portion 16 and a depending portion 17 which partially enclose the gear chamber 18, and a diagonal portion 19 extending from end wall 12 along the bottom of depending wall 17 as best shown in Figs. 1 and 4. In addition there is formed on the casting four corner lugs 20, each provided with a depending peg 21, and a boss 23 on the end wall 13 and boss 24 and depending lug 25 on wall 17 together with bosses 24' on the wall 13 and bosses 24'' on the wall 12 which form bearings for the gearing and cutter rolls. The boss 23 on the wall 13 and the depending boss 25 form bearings for the gear shaft 32. (See Figure 6.)

It will be apparent from the above that the entire framework of my meat tenderizer is comprised in an integral single unitary casting. All of the operating parts are supported upon this casting and the casting itself is supported upon any suitable surface by rubber feet 22 applied to the cast pegs 21. This makes a supporting structure which is completely rigid and which has no parts that can get loose or can cause wear between parts or result in noisy operation.

In addition to the chamber 18 which is in effect the gear casing or gear housing, there is a motor chamber 26, Figs. 4 and 6, which receives the motor 27 for operating the parts. For supporting this motor I use a bracket arm 28 bolted to the wall 14 of the casing casting at 29 and secured by bolts, screws or the like to a side of the motor casing at 30. The motor is supported in the chamber 26 adjacent the opening all around the bottom thereof as indicated at 31 in Figs. 1 and 6, giving free circulation of air about the motor casing and thus tending to keep the motor cool and in the best operating condition.

Mounted in bearings in lugs 23 and 25 is the main pulley shaft 32, Fig. 12, operated by drive belt 33 running from the motor pulley 34, Figs. 6 and 12. A pinion 35 on pulley shaft 32 meshes with a spur gear 36 on a gear shaft 37. A spur gear 39 is also mounted on the shaft 37 at one end of cutter roll 41, Figs. 6 and 7. The spur gear 39 on shaft 37 meshes with a spur gear 42 of the same size on shaft 43 of the second cutter roll 44. The shafts 37 and 43 are journalled at their respective ends in the side wall 12 and the depending wall 17 in bosses similar to the boss 24. The two cutter rolls 41 and 44 are positioned as indicated in Figs. 6 and 7, and carry a multiplicity of circular cutting knife discs 45 and 46 as indicated in Figs. 6 and 11. The knives of these discs are shown in enlarged detail in Fig. 11 and comprise for each roll a series of teeth 47 formed with sharpened arcuate cutting edges 48, all as set forth in my aforesaid application for letters patent. These cutter knives are staggered relative to one another on the two cutter rolls 41 and 44 so that they pass each other in close proximity as the rolls are rotated.

A cover member 49 has a hinge 50 secured at 51 to the diagonal casting wall 19. This cover member thus is positioned to swing directly outwardly as indicated in Fig. 6. The cover member is provided with an elongated oval slot 52 in which is seated a removable upper guard throat member 53 shown in separate detail in Fig. 5.

When the cover 49 is in closed position as indicated in Figs. 1 and 7, the throat passageway 54 through throat member 53 is positioned directly above the cutter roll 41 and its knives. Slices of meat fed through passageway 54 are guided into position to be acted upon by the knives by a pair of grills 55 and 56 which are formed of a multiplicity of fingers spaced apart to permit the rotary cutter knives 45 and 46 to pass between them. The grill 55 is mounted on a bar 57 and the grill 56 is mounted on a bar 58. The ends of these bars are adapted to be introduced in slots 59 and 60, Fig. 7, in a bracket arm 61 which is secured by screw bolt 62 to the sloping casting wall 19. When, therefore, the cover member 49 is closed, slices of meat such as steak and the like can be fed through the throat opening 54 of the throat piece 53 and will be guided into the grills 55 and 56 to a position between the rotating knives 45 and 46. These grills form in effect sets of stripper fingers between pairs of which the several knives operate. These knives are rotating toward each other so that they pass downwardly in the same direction and simultaneously make a vast number of cuts through the slice of meat from each side thereof.

After the meat passes between the wringer-like tenderizing rolls it falls upon the sloping wall 19 and feeds out through opening 63 at the front of the casing as indicated in Figs. 1 and 6. When the machine is being fed in this manner with the cover 49 closed and the meat being passed through the throat opening 54 in the throat piece 53 and being guided between the cutter knives by the grill members 55 and 56, there will be no danger that the operator will be injured. When sharpening or cleaning the blades of the rollers the cover 49 is tilted back, exposing the knife blades. Then there is danger that the operator may get his fingers in position to be seized by the cutter knives, and if and when that happens the fingers and hand may be dragged down in and very seriously mangled and chopped.

To make it impossible for this to happen, I have formed the bracket 61 with a bearing opening 64, Fig. 8, which receives a pin 65 fast on the end of a bar 66. There are, of course, brackets 61 on each side of the cutter chamber as clearly indicated in Fig. 3, and the bar 66 extends between these bracket members and is adapted to be oscillated upon the pins 65 on the ends thereof. For the purpose of oscillating this bar 66 to bring it out of the steak feeding throat when the cover 49 is closed and to bring it across that throat when the cover 49 is open, I form on the bar 66 a lug 67 which is pivotally connected by means of a bolt 68, Fig. 7, with a link arm 69. This link arm in turn is pivoted at 70 to an inwardly projecting plate member 71 secured to the cover member 49 a suitable short distance radially from the pivot of cover 49 at the hinge 50. Obviously, other means such as cam, plunger, or springs can be used to actuate the guard. With this arrangement, when the cover is in closed position, as shown in Fig. 7, the guard plate 66 is held substantially vertical adjacent the vertical portion of the grill 56 in which it is out of the way of the feed of steak down through the throat opening 54 in the throat piece 53. But when the cover is swung to the full open position of Fig. 6, the link 69 operating through pivots 68 and 70 will swing the guard bar into the position of Figs. 6 and 11. This absolutely prevents the possibility of accident through getting the fingers of the operator in a position to be seized and mangled by the rotating knives 45 and 46. It prevents this happening accidentally and at the same time it prevents the use of the machine for the purpose intended when the cover is swung over. This is advantageous, not only as a protection against possible mangling of the fingers, but because the operator can clean the knife blades without danger, as well as sharpen the same. Obviously the blades should be kept sharp. Thus the operator can quickly and easily sharpen the blades at any time by tilting the cover back (exposing the blades), and with the machine running he holds the triangular sharpening tool between the edges of the blades to sharpen the same.

In Fig. 13 a modified form of my invention is disclosed. In this modified form of my invention I provide a means whereby the guard bar 75 is actuated indirectly by a pin 76 which is secured to the cover 49. The pin 76 may be fixed to the cover 49 by any desirable means. As best illustrated in Figs. 14 and 16, a bell-crank 77 is pivoted to the wall 17 by means of a cap screw 79. The cap screw 79 extends through an aperture 80 in the bell-crank 77, through a spacer sleeve 81, and is threaded to the wall 17, Fig. 16. A flat rod 82 pivotally connects the bell-crank 77 to a bracket plate 83 which is in turn rigidly secured to the guard bar 75. The bracket plate 83 may be attached to the guard bar 75 by means of a cap screw 84 or by any other suitable means.

As best illustrated in Fig. 15, the flat rod 82 is pivoted to the bracket plate 83 by means of a bolt 85. Washers 86 are provided which are positioned between the plate 83 and the bar 82 and between the head of the bolt 85 and the bar 82. By such a construction the flat bar 82 may be very easily pivoted with respect to the bracket plate 83 and yet a very substantial connection is provided between the bar and the bracket plate.

A spring 87, Fig. 17, is provided which is attached to the end wall 17 by means of a bolt 89 and which is adapted to spring against the bell-crank 77 and against a peg 90 which is threaded to the end wall 17. By means of the peg 90, the spring 87 is adapted to put tension against the bell-crank 77, which tension tends to pivot the bell-crank as viewed in Fig. 13.

In Figs. 13 and 14 I also disclose a modified form of mounting the grill members 91 and 92. The grill members 91 and 92 are positioned and held in a substantially rigid position by means of plates 93. The plates 93 are provided with slots 94 which are adapted to accommodate the bar ends 95 of the grill members 91 and 92. The plates 93 are rigidly secured to the walls of the casting by means of bolts 96. By such an arrangement the grill members 91 and 92 may be very easily placed and withdrawn from the plates 93.

The operation of the guard bar 75 is as follows: When the cover 49 is closed the pin 76 is adapted to contact the bell-crank 77, which action compresses the spring 87 and at the same time pivots the bracket plate 83, which in turn pivots the guard bar 75 into a vertical position as is best shown in Fig. 14. When the guard bar 75 is in a vertical position the meat to be tenderized may be inserted through the top of the cover down through the tenderizing cutters. When the cover 49 is pivoted into an open position, the pin 76 leaves the bell-crank 77, which action causes the spring 87 to pivot the bell-crank 77 outwardly as viewed in Fig. 13. When the bell-crank 77 is actuated by the spring 87 the bar 82 moves the bracket 83 into such a position, whereby the guard bar 75 retains a horizontal position best shown in Fig. 13. By such a construction I have provided a means whereby the guard bar 75 is actuated by the closing of the cover 49 and which is actuated by the spring 87 when the cover 49 is opened.

I claim:

1. A meat tenderizer having tenderizer wringer-like operating rolls with a multiplicity of meat cutting blades, a cover guard means normally over said rolls, an inner guard means for the receiving side of said rolls normally spaced from the receiving side of said rolls, and means for moving said inner guide means into position to close the receiving side of said rolls, when the cover means is withdrawn from over said rolls.

2. A meat tenderizer comprising a unitary casting formed with a series of walls to provide an open-bottomed motor chamber and a gearing chamber both enclosed within said unitary casting walls, an open-topped operating chamber, positioned between and above said unitary casting walls, a pair of tenderizer rolls in the operating chamber driven by a motor in the motor chamber through gearing in the gearing chamber and said motor chamber, a cover member hinged to said casting at the top of the back wall and a meat guide thereon adapted when in closed position to form an upper covering of the operating chamber and a guard means and guide for meat to the tenderizer rolls, and a guard plate pivoted at an edge between casting walls of said operating chamber and connected with the cover so as to be moved out of the line of feed to the tenderizer rolls when the cover is swung to closed position and to be moved across said line of feed and over exposed portions of said tenderizer rolls when the cover is swung to open position.

3. A meat tenderizer comprising a frame casting forming an open-topped operating chamber, a pair of tenderizer rolls mounted for conjoint operation in said operating chamber, means for driving the rolls so that adjacent parts of the knives thereon will move in the same direction and be exposed at their upper portions to receive slices of meat, a cover member carrying a guide and guard throat for directing meat between the tenderizer rolls when the cover is in closing position, an inner guard, and means connecting said inner guard with said cover whereby when said cover is moved to open position said inner guard will be automatically brought adjacent said tenderizer rollers to close the receiving sides of said rollers.

4. In a meat tenderizer having tenderizer rolls with a multiplicity of blade knives thereon driven so as simultaneously to make a multiplicity of cuts in opposite sides of a slice of meat and feed the same between the rolls, a cover and means thereon for guiding the meat between the tenderizer rolls, a guard plate held out of the line of movement of the meat when the cover is closed, and means operative upon the guard plate so that when the cover is moved to open position the guard plate will automatically be brought over adjacent parts of the tenderizer rolls.

5. In a meat tenderizer having tenderizer rolls with a multiplicity of short knives thereon driven so as simultaneously to make a multiplicity of short cuts in a slice of meat and feed the same between them, two sets of stripper fingers through which the knives operate, said fingers forming a guide for slices of meat extending between the tenderizer rolls and the knives thereon, a hinged cover including additional guide means which when the cover is closed will lead the slices of meat to the space between said fingers, a guard plate, and means connecting the guard plate with the cover so that when the cover is swung to closed position the guard plate is brought out of the line of feed of the meat to the tenderizer rolls and when the cover is swung to open position the guard plate is brought into a position above the junction of the tenderizer rolls to protect an operator against possibility of getting his fingers caught and mangled by the tenderizer rolls.

6. In a meat tenderizer having tenderizer rolls, with a multiplicity of short knives thereon driven so as simultaneously to make a multiplicity of short cuts on opposite sides of a slice of meat and feed the same between the rolls, a hinged cover and means thereon for directing meat between the tenderizer rolls, a guard plate hinged at its lower edge, a link connected with the guard plate and with the cover, said link operating to hold the guard plate out of the line of movement of the meat when the cover is in closed position and to move the guard plate over adjacent parts of the tenderizer rolls when the cover is moved to open position.

7. In a meat tenderizer having tenderizer rolls with a multiplicity of blade knives thereon driven so as simultaneously to make a multiplicity of cuts in opposite sides of a slice of meat and feed the same between the rolls, a cover and means thereon for guiding the meat between the tenderizer rolls, a guard means for the receiving side of said rolls, and means for operating said guard means whereby when the cover is moved to closed position, said guard means will be taken out of the line of movement of the meat and when the cover is moved to open position said guard means will be brought over adjacent parts of the tenderizer rolls.

8. A meat tenderizer having tenderizer wringer-like operating rolls with a multiplicity of meat cutting blades, a tiltable cover guard means normally over said rolls, an inner guard means for the receiving side of said rolls normally spaced from the receiving side of said rolls, and means actuated by tilting the cover guard to open position for moving said inner guard means into position to close and guard the receiving side of said rolls.

9. A meat tenderizer, comprising a unitary casting formed with a series of walls to provide an open-bottomed motor chamber, an open-topped operating chamber, a gearing chamber positioned to one side of and in connection with said motor chamber, the walls of said unitary casting being formed integral, means for supporting the casting with its lower edges spaced from the surface supporting the meat tenderizer, a motor supported from said casting in the motor chamber and positioned above the open bottom thereof, tenderizing rolls supported in the operating chamber, and a train of gearing and belt means supported in said gearing chamber and connecting the tenderizing rolls with the motor, the top and sides of said motor chamber and gearing chamber being closed while the bottom thereof is open for air circulation.

ALDRICH L. JACKSON.